April 12, 1955    J. B. WALKER    2,705,908

AUTOMATIC NON-PARALLAX DUAL LENS

Filed July 12, 1954

INVENTOR.
JOSEPH B. WALKER
BY Harry R. Lubcke
AGENT

United States Patent Office 2,705,908
Patented Apr. 12, 1955

2,705,908

AUTOMATIC NON-PARALLAX DUAL LENS

Joseph B. Walker, Los Angeles, Calif.

Application July 12, 1954, Serial No. 442,577

12 Claims. (Cl. 95—45)

My invention relates to a long-shot-close-up dual lens mechanism and means for automatically eliminating the effect of parallax therein. Remote control means allow an optical wipe from the long-shot to the close-up image and vice versa. The parallax-free aspect insures that the close-up image is of the object of principal interest in the long-shot.

It is a fundamental human want for the observer of a television or motion picture program to want to view in detail the object of principal interest in an over-all scene. Analysis of television and motion picture productions reveals that this device is often used. At times it can be accomplished by a zoom lens, at other times two cameras with widely differing focal length lenses are required. In any event, a quick and certain transition from the long-shot to the close-up of the object of principal interest is required. This is pleasing to the viewer. A delay of more than one or two seconds or the presentation of a close-up to one side of the object of principal interest is disturbing. Panning around to find the object is inexcusable, but only those who have worked such cameras know how difficult it is to rapidly and accurately locate the object of principal interest by the work of the camera operator.

A dual lens upon one camera which constantly allows the director the choice of a long-shot, or a close-up of the object of principal interest in that long-shot, is thus seen to be most valuable. In many instances it makes possible production heretofore impossible. In every instance it accomplishes a saving in the number of cameras and operators required.

An object of my invention is to provide a dual lens system capable of forming two images of a field of view having different magnifications for mutually exclusive exhibition upon a single surface.

Another object is to automatically eliminate parallax between two optical assemblies of different focal lengths.

Another object is to provide unitary means for presenting a close-up of the object of principal interest in a long-shot.

Another object is to provide means coactive with one camera which will accomplish what has heretofore required two cameras.

Another object is to provide a close-up lens assembly in the form of an attachment to a long-shot lens assembly.

Another object is to provide a second lens by attachments having different optical properties which can be simply and quickly attached as separate units to an unaltered basic lens assembly.

Other objects of my invention will be apparent upon reading the following detailed specification and upon examining the related drawings, in which.

Briefly, my invention may be described as follows. Means are provided for focusing a second lens for the same distance into the field of view as the basic lens of the camera. Associated with the mechanical structure of the second lens is a cam. In contact therewith a cam follower orients a mirror to eliminate parallax. A second mirror is moved in and out of the optical path of the basic lens to either complete the optical path of the second lens to the working surface and block the path of the basic lens, or to allow the path of the basic lens to be unobstructed and that of the second lens uncompleted to the working surface. Necessary motions are preferably accomplished by motor drives.

Figure 1:
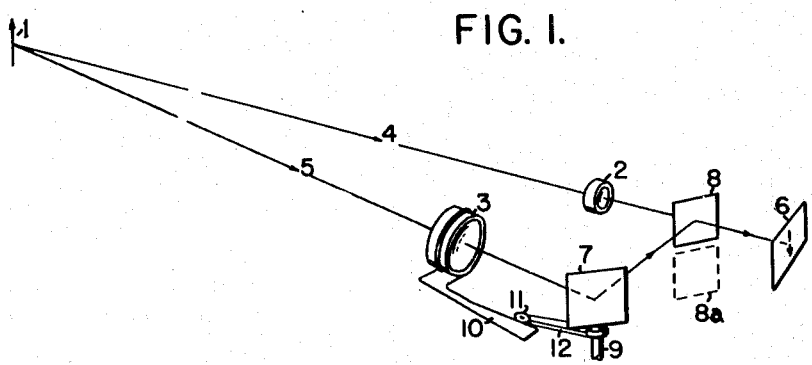
Fig. 1 shows a perspective view of the essence of my invention.

In Fig. 1 numeral 1 represents an object of principal interest in a field of view of my general camera-like invention. Similarly, 2 represents a short focal length lens, either of the fixed focal length type as commonly used or of the variable focal length zoom type of which the Electrazoom lens of my U. S. Patents 2,515,104, July 11, 1950; 2,532,685, December 5, 1950; and 2,547,187, April 3, 1951, is an example. A long focal length lens 3 is positioned beside or otherwise laterally of lens 2. Both lenses are focused by translation along the respective axes 4 and 5, the lenses being closer to the working surface 6, upon which the images are formed, for an object 1 at a great distance than for an object relatively close to the camera.

The optical path of lens 3 embraces axis 5, lens 3 proper, reflective surface (or mirror) 7, second reflective surface (or mirror) 8 and surface 6. The optical path of lens 2 embraces axis 4, lens 2 proper, and surface 6. When lens 2 is in use the second reflective surface 8 is moved out of the optical path, i. e., as shown dotted at 8a.

The plane of mirror 8 is normally fixed with respect to the other elements, but mirror 7 is pivoted upon a vertical shaft 9 for the configuration shown. Attached to lens 3 is a cam 10. A roller 11 attached to arm 12, which in turn is attached to shaft 9, comprises the parallax-eliminating structure.

I have found that the necessary shape of the surface of the cam is merely a plane disposed at an angle to axis 5; kinematically, a straight line thus disposed. This simplicity is an important contribution to the practical value of my invention, as will be immediately understood by those skilled in the art. For unusual situations the surface may depart from a plane and I do not limit my invention thereto. Should the desired close-up be in one corner of the field of view, as the close-up of first base in the view of a baseball game, or for extreme accuracy with certain lenses, a curve may be required.

Surface 6 is the surface upon which the image of the field of view, either long-shot or close-up, is formed. It is usually one frame of a motion picture film or the sensitive photo-electric surface of an image-orthicon television camera tube, although it may be the film or plate of any photographic camera, any kind of energy-sensitive surface, a ground glass for viewing, or other equivalents.

The reflective surfaces 7 and 8 are at essentially 45° to the quasi-parallel axes 4 and 5. The displacements of lenses 2 and 3 for focusing and the removal and replacement of second reflective surface 8 with respect to the optical path of lens 2 may be accomplished by manual means. However, a smooth and rapid motion is essential to a transition pleasing to the viewer and is best accomplished by motor drives as illustrated in Fig. 2.

Figure 2:
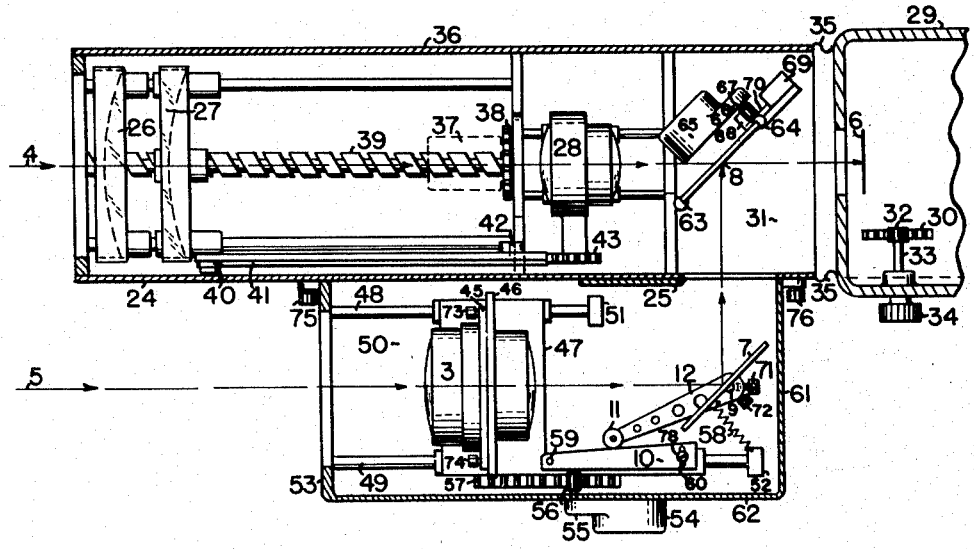
Fig. 2 shows a plan view of an embodiment of my invention, with the necessary mechanism detailed.

In Fig. 2 axes 4 and 5 correspond to axes 4 and 5 in Fig. 1. Lens 2 becomes an Electrazoom assembly comprising optional positive (converging) lens 26, movable negative (diverging) lens 27 and movable positive lens 28. Lens 3 normally has a focal length a few times greater than the average focal length of the lens 2 assembly. It must always be longer because of the additional back-focal distance included between mirrors 7 and 8.

It is to be noted that my dual lens is intrinsically different from an arrangement of identical lenses placed side by side for stereoscopic purposes.

Surface 6 is shown housed in a camera case 29 in Fig. 2. This is provided with focus adjusting means comprised of rack 30 attached to base plate 31 of the main (Electrazoom, as shown) lens, pinion 32, shaft 33 and knob 34. A bellows 35 allows relative motion between camera 29 and base 31 whilst maintaining a light-tight relation to enclosing cover 36.

The focal length of the Electrazoom lens is varied by bringing lenses 27 and 28 closer together for a long focal length (close-up) and vice versa for a short focal length (long-shot). Motor 37 drives gear 38 and worm 39, moving lens 27. Follower 40, attached to the lens, bears on cam 41, pivoted at 42, which actuates rack 43, moving lens 28 in the necessary relation described in my patents above-referred to.

Lens 3 is mounted on plate 45. This fits against plate 46, being secured by thumb-screws 73, 74. Plate 46, in turn, is fastened to horizontal carriage 47, which slides upon rods 48 and 49. The rods are attached to the base plate 50 of the attachment by blocks 51 and 52, and also to the front face 53 thereof. Motor 54, through an internal speed reduction gear train housed in portion 55, drives pinion 56 and engaged rack 57; the latter being mounted upon carriage 47. Hence, activation of motor 54 in one direction or the other causes lens 3 to be focused upon the object of principal interest (1, in Fig. 1) according to the selection thereof by the operator.

Cam 10 is also attached to carriage 47. As the latter moves, follower 11 will be moved either toward or away from the axis 5, depending upon the direction of the motion. When lens 3 is focussed on "infinity" it is in the most rearward position and follower 11 is farthest from the axis. Arm 12, being pivoted upon vertical shaft 9 and also holding the follower, will be caused to rotate. Reflective surface 7 is also attached to shaft 9 and thus also rotates. The rotation imparted by the elements mentioned is that required to eliminate parallax between the images formed by my dual lens. With the lens 3 focussed for infinity the axes traced back from a point on surface 6 result in axes 4 and 5 being parallel. When lens 3 is focussed upon a nearby object the axes "toe in," the change in direction taking place in axis 5. The angle of rotation of mirror 7 is only a few degrees in practice. Tensioned spring 58 is attached to arm 12 and block 52. It is provided to keep follower 11 constantly in contact with cam 10.

Cam 10 may be cut and fixedly installed for any lens 3. However, in order to provide usual optical adjustments and thereby accommodate lenses 3 of different optical properties and focal length I have used pin 59, slot 60 and bolt assembly 78 to allow the angle of the cam to be altered. In practice I prefer to provide a whole attachment, bounded by sides 53, 61 and 62 for each lens 3 of different focal length, i. e., one for a focal length of twelve inches, another for a focal length of twenty inches, and so on. My invention is not limited to this arrangement, since by adjustment of the cam, the use of substitute cams and substitute lenses 3 nearly any values may be reached with one attachment.

Mirror 8 moves up and down in guides 63 and 64 to accomplish the wipe from long-shot to close-up or vice versa. A motor 65, similar to motor 54, has reduction gear train 66 driving pinion 67. This engages vertically disposed rack 68 and accomplishes the vertical movement. The guides are to the side and other auxiliary elements are above or below the optical path delineated by axis 4, so that when element 8 is in the lowered position this path is in no way obstructed. When the mirror moves up it progressively obstructs the path of axis 4 and simultaneously redirects that of axis 5 so that one image is replaced by the other in a vertical optical transition. It is also possible to arrange the structure associated with mirror 8 to move it down instead of up, or from side to side, but the direction originally stated results in a more compact over-all structure and gives an effect deemed aesthetically superior by most observers. It should be remembered that when element 8 rises in the apparatus the transition appears to move from top to bottom in the image finally seen by the public since the camera image is upside down.

A limit microswitch 69 is positioned above the upper limit of travel of mirror 8 and the wire feeler 70 thereof is intercepted by the mirror structure at the upper limit, opening the electric circuit of motor 65. An equivalent switch is located below the lower limit of travel and functions to stop the downward motion of the mirror at the location where the optical path from lens 28 is unobstructed to surface 6 and that of lens 3 not at all reflected thereto.

Mirrors 7 and 8 are preferably of the first surface type for clarity of image on surface 6. By substituting for mirror 8 an equivalent one having an inclined upper edge it is possible to obtain the effect of one image replacing the other along an inclined dividing line rather than along a horizontal dividing line. Any other shape of line may also be obtained by making the corresponding shape in the upper edge of mirror 8.

It is usual that the object of principal interest is in the center of the long-shot and so the relative optical paths defined by axes 4 and 5 are normally adjusted to lie in the center of each field of view. It is possible to alter the horizontal position of the portion of the long-shot field of view displayed by the close-up assembly by altering the angular position of mirror 7. Thumbscrew 71 may therefore be loosened and this alteration accomplished. Similarly, the vertical position may be altered by changing the inclination of the mirror 7 with respect to shaft 9 by means of screw 72. Somewhat equivalent vertical and horizontal adjustments can be accomplished by changing the lateral position of lens 3 by shifting plate 45 with respect to plate 46 and tightening screws 73 and 74.

It may be mentioned in passing that the several holes shown in arm 12 are for structurally lightening the same according to good optical practice.

Thumbscrews 75 and 76 serve to fasten the long focal length attachment to the body of the Electrazoom or equivalent lens of fixed focal length. As embodied in Fig. 2 the attachment 53, 61, 62 is affixed to side 24 of the basic lens. The hole required for the optical path after this leaves mirror 7 is provided by a door 25 in side 24; shown open in Fig. 2. Should the attachment be left off it is only necessary to close door 25.

Figure 3:
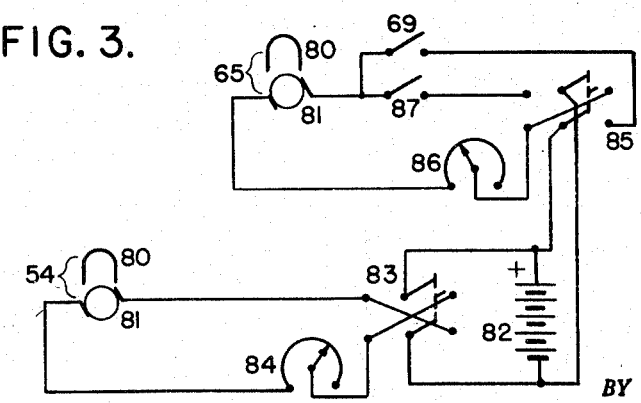
Fig. 3 shows the electrical circuit diagram for the actuating motors.

The electrical circuit diagram is shown in Fig. 3. Motors 54 and 65 are shown of the permanent magnet type, each having a strong permanent magnet 80 and the usual commutator-brush assembly 81. These motors are small and are reversed by reversing the polarity of the electrical energy reaching the commutators. Other known small motors may be employed, of course, with suitable circuit modification, if necessary.

The source of power is shown as battery 82, which is also illustrative of a rectifier unit upon an A. C. power line, a source of vacuum tube anode supply, and so on. The circuit from the battery is conveyed to the blades of a reversing switch 83. From the usual cross-jaw connections one conductor passes to rheostat 84 and thence to one brush of motor 54. The rheostat is included to regulate the speed with which focus is adjusted on lens 3. A friction clutch is part of the internal mechanism of motor 54 so that actuation thereof beyond the normal travel on rods 48, 49 (Fig. 2) will not be damaging.

The battery is also connected to another reversing switch 85 for energizing motor 65 in either direction. Another rheostat 86 controls the speed with which the scene is changed from long-shot to close-up and vice versa. This adjustment is relatively important, in that different artistic effects are created by different transitional speeds. It should be noted that should the transition be halted half way through, a half long-shot half close-up composite image can be attained. As to which half is long-shot and which half close-up can be altered by moving mirror 8 either out at the top or out at the bottom of the optical path surrounding axis 4.

Rheostat 86 is connected to one brush of motor 65. The other brush passes to one terminal of two microswitches, microswitch 69 shown in Fig. 2 and microswitch 87 located below it and thus not separately seen in that figure. The other terminals of the microswitches are connected to diagonally opposite jaws of reversing switch 85. Microswitch 69 opens upon a maximum upward excursion of mirror 8 and microswitch 87 upon a maximum downward excursion. This opens the appropriate circuit branch to stop these motions.

The electrical controls 83, 84, 85 and 86 may be placed within the reach of the cameraman or they may be extended by the wires shown in Fig. 3 to the television control room so as to be under the control of the video operator, the technical director or the program director. Similar production facility is afforded in the production of motion pictures.

In these ways it will be seen that I attain the several objects of my invention.

Illustrative numerical values have been given for certain parameters in this specification in order to most simply teach how the invention may be practiced. However, wide departures may be taken from such values and changes in details of the structure and circuitry made. Other modifications in the size, proportions, shape and arrangement of parts may be made without departing from the spirit of the invention as herein set forth.

Having now fully described my invention and the manner in which it is to be practiced, I claim:

1. In a mutually exclusive double image optical system having a short focal length lens, a long focal length lens therebeside, an image surface behind said short focal length lens, and a mirror behind said long focal length lens; the combination of a cam attached to said long focal length lens, a follower riding upon said cam, an arm connecting said follower to said mirror, a second mirror behind said short focal length lens and in front of said image surface, said mirrors positioned to reflect the image formed by said long focal length lens to said image surface, and means to move said second mirror away from its aforesaid position to substitutionally cause the image of said short focal length lens to form upon said image surface.

2. An automatic parallax-free dual lens comprising a short focal length lens, a long focal length lens, said lenses positioned transversely one to the other with respect to a common field of view, an image surface, a reflective surface in the path between said long focal length lens and said image surface, a second reflective surface in the path between said long focal length lens and said image surface, said second surface also in the path of said short focal length lens as an opaque obstacle, electromechanical means to remove and replace said second surface from said paths at will, and a linkage connecting said long focal length lens with said first reflective surface to direct the optical path of said long focal length lens to coincide with that of said short focal length lens at the object of principal interest in said field of view upon which said long focal length lens is focused.

3. The dual lens of claim 2 in which said electromechanical means consists of a motor, rack and guides, and said linkage consists of a straight cam, a follower and an arm.

4. An automatic non-parallax dual lens comprising a short focal length lens, a long focal length lens, said lenses positioned transversely one to the other with respect to the direction to a common field of view, separate means to focus each said lens to form an image upon a working surface, a cam connected to said long focal length lens, a mirror in the path between said long focal length lens and said surface positioned to reflect said path at approximately a right angle, a second mirror nearer said surface likewise positioned to reflect said path at approximately a right angle, said thus twice reflected path being then approximately parallel to the original optical path of said long focal length lens, said second mirror in the optical path of said short focal length lens as an opaque obstacle, reversible mechanical means for moving said second mirror out of the paths of both said lenses, a follower riding upon said cam, an arm connected to said follower and to said mirror for the rotational displacement of said mirror, the optical and mechanical properties of said elements proportioned to direct the optical path of said long focal length lens to intersect that of the short focal length lens in the field of view at that distance to which the long focal length lens is focused.

5. A parallax compensated bi-lens comprising a short focal length lens assembly, means to vary the focal length of said lens assembly, a long focal length lens, said lens and said lens assembly mounted one beside the other, the optical axes thereof passing into a common field of view, a working surface, said surface lying upon the optical axis of said lens assembly and positioned substantially perpendicularly to the axis thereof; a first reflective surface lying upon the optical axis of said long focal length lens, said surface oriented to change the direction of said axis toward the axis of said lens assembly, a second reflective surface, means to remove and replace said second surface as an obstacle athwart the axis of said lens assembly, said second surface positioned and oriented with respect to the optical axis of said long focal length lens as changed in direction to again change the direction of that axis to substantially coincide with that of said lens assembly between said second surface and said working surface; a cam attached to said long focal length lens, a follower attached to said first reflective surface for the rotation thereof according to the longitudinal position of said long focal length lens along the axis thereof to cause the axes of said lens and said assembly to intersect in said field of view at the point to which said long focal length lens is focused; the image of said field of view at said point being formed upon said surface by said long focal length lens by interposition of said second reflective surface into the axis of said lens assembly.

6. A compound optical system for substitutionally forming images of different magnifications of an object comprising a short focal length lens, a long focal length lens, a mounting for said lenses positioning the same adjacently upon quasi-parallel axes, an image surface, said surface substantially perpendicular to and intersecting the axis of said short focal length lens, a first reflecting surface, said surface intersecting the optical axis of said long focal length lens and lying at an angle thereto such that said axis thus reflected intersects the axis of said short focal length lens, a second reflecting surface positioned at the intersection of said axes, said second surface oriented to reflect the optical axis of said long focal length lens substantially coincidently with the axis of said short focal length lens from said surface to said image surface, means to remove said second reflecting surface from the intersection of said axes for forming the image of said object upon said image surface by said short focal length lens, means to replace said second reflecting surface at the intersection of said axes for forming the image of said object upon said image surface by said long focal length lens; a cam attached to said long focal length lens, means to translate said long focal length lens and said cam for focusing said long focal length lens, a follower bearing upon said cam, an arm attaching said follower to said first reflecting surface for the rotation thereof, means to orient said mounting to place said object within the field of view of said short focal length lens, said cam and arm proportioned to place said object within the same relative portion of the field of view of said long focal length lens as it occupied in the field of said short focal length lens when said long focal length lens is focused upon said object by manipulation of said translating means.

7. In a dual lens system for selectively forming images of different magnification of a common field of view having means for causing the image formed by the lens of higher magnification to contain specified subject matter found in the image formed by the lens of lower magnification regardless of the distance from said system to said subject matter; the combination of a cam having a side oblique with respect to the optical axis of the lens of higher magnification of the system, said cam attached to said lens, a follower riding upon said side, a reflective surface rearward of said lens of higher magnification for changing the direction of the optical axis thereof, said follower connected to said reflective surface for the rotation thereof, and means to focus said lens of higher magnification by the axial translation thereof, the recited kinematic structure altering said direction of said optical axis to contain the specified subject matter found in the image formed by the lens of lower magnification.

8. In combination, two lenses for forming images of widely different magnifications and means for selectively passing one or the other said images to an image surface comprising, a variable focal length lens for producing images of relatively low magnification, a fixed focal length lens for producing images of relatively high magnification, a mounting for positioning said lenses on substantially parallel axes, an image surface intersecting the axis of said variable lens and lying substantially perpendicular thereto; means to adjust the axial position of said fixed lens for focusing, a first reflective surface intersecting the axis thereof at an angle such that the optical axis thereof is reflected toward the axis of said variable lens, a member attached to said fixed lens having a face inclined to the axis thereof, a follower bearing upon said face, an arm attached to said follower, a shaft attached to said first reflective surface, said arm attached to said shaft for the rotation thereof according to the inclination of said member, said rotation reflecting said optical axis to have a specified relation to the axis of said short focal length lens at the distance to which said long focal length lens is focused, means to adjust said reflective surface relative to said arm for determining said specified relation, a second reflective surface intersecting the axis of said short focal length lens rearward thereof and lying at an angle thereto, said second surface positioned along said axis and at an angle such that the optical axis reflected by said first reflective surface impinges thereon and is reflected substantially colinearly with the axis of said short focal length lens from said second reflective surface to said image surface, means to move said second reflective surface transversely of the axis of said short focal length lens at will for the formation of an image formed by said lens or by said long focal length lens upon said image surface.

9. The combination of claim 8, in which said second reflective surface is moved partially from the axis of said short focal length lens, forming a partial image from each of said lenses upon said image surface.

10. A lens coordinating system for forming images of different magnification of the same object upon a surface comprising a first lens of low magnification, said surface lying upon the optical axis of said lens, a second lens of high magnification, a first reflective surface therebehind, said reflective surface oriented to reflect the optical axis of said second lens to substantially intersect that of said first lens, a second reflective surface positioned at said intersection of axes and oriented to reflect the optical axis of said second lens to said surface for the formation of the image from said lens upon said surface, a cam attached to said second lens, a follower bearing upon said cam, said follower connected to said first reflective surface for the rotation thereof, axially translative means for focusing said second lens, said cam, follower and connection to said first reflective surface proportioned to eliminate the effect of parallax between said lenses with respect to the object upon which said second lens is focused and means for removing said second reflective surface from the axis of said first lens to allow the image of said first lens to be formed upon said surface.

11. An optical system for forming images of different magnifications upon a surface comprising a short focal length lens, means to focus an image formed by said lens upon said surface, a long focal length lens, means to focus an image formed by said lens upon said surface, a cam having a face inclined to the optical axis of said long focal length lens, said cam attached to said lens, a first reflective surface impinged upon by the optical axis of said long focal length lens, said reflective surface oriented to reflect said optical axis to intersection with the optical axis of said short focal length lens rearward of said lens, a second reflective surface positioned at the intersection of said optical axes and oriented to reflect the optical axis of said long focal length lens substantially colinearly with the axis of said short focal length lens from said reflective surface to the image surface, means to translate said second reflective surface from the intersection of said axes for the substitution of the image of said short focal length lens for the image of said long focal length lens upon said surface, said substitution occuring proportionally in the area of said image to said translation during the transition from one said image to the other; a follower bearing upon said cam face, an arm attached to said follower and to said first reflective surface for altering the orientation thereof according to the axial movement of said long focal length lens, means to adjust said arm in relation to said first reflective surface to direct the optical axis of said long focal length lens to a selected area in the field of view of said short focal length lens at the distance to focus of said long focal length lens into said field of view, the relation of said area in said field of view remaining the same for various distances to focus of said long focal length lens by virtue of the recited kinematic structure between said lens and said first reflective surface.

12. A lens coordinating system for forming images of different magnification of fields of view having a common area upon a surface comprising a first lens of low magnification, said surface lying upon the optical axis of said lens, a second lens of higher magnification, said lens translatably supported for focusing, a motor to translate said lens, means to reverse the direction of rotation of said motor to reverse said translation, means to alter the speed of said translation, a first reflective surface behind said second lens, said reflective surface oriented to reflect the optical path of said second lens to substantially intersect that of said first lens, a second reflective surface positioned at said intersection and oriented to reflect the optical path of said second lens to said surface for the formation of the image from said second lens upon said surface, a cam attached to said second lens, a follower bearing upon said cam, said follower connected to said first reflective surface for the rotation thereof, said cam, follower and connection to said first reflective surface proportioned to eliminate parallax between said lenses with respect to the depth in the field of view for which said second lens is focused; a support for said second reflective surface allowing translation thereof, a motor for translating said second reflective surface, means for reversing the direction of rotation of said motor, a first limit switch actuated by said second reflective surface for stopping said motor when said second reflective surface is positioned to completely reflect the optical path of said second lens, a second limit switch similarly actuated when said second reflective surface is positioned such that it does not reflect the optical path of said second lens at all, the image from said first lens being formed upon said surface when said second reflective surface is in the latter position.

No references cited.